United States Patent
Todd et al.

(10) Patent No.: US 12,018,206 B2
(45) Date of Patent: Jun. 25, 2024

(54) DRILL-IN FLUID COMPOSITIONS AND METHODS

(71) Applicant: LyondellBasell Advanced Polymers Inc., Houston, TX (US)

(72) Inventors: Bradley L. Todd, Duncan, OK (US); Kristie Ince, Duncan, OK (US)

(73) Assignee: LyondellBasell Advanced Polymers Inc., Houston, TX (US)

( * ) Notice: Subject to any disclaimer, the term of this patent is extended or adjusted under 35 U.S.C. 154(b) by 0 days.

(21) Appl. No.: 18/061,820

(22) Filed: Dec. 5, 2022

(65) Prior Publication Data
US 2023/0174840 A1    Jun. 8, 2023

Related U.S. Application Data

(60) Provisional application No. 63/286,621, filed on Dec. 7, 2021.

(51) Int. Cl.
*E21B 21/00* (2006.01)
*C09K 8/08* (2006.01)
*C09K 8/514* (2006.01)

(52) U.S. Cl.
CPC .............. *C09K 8/08* (2013.01); *C09K 8/514* (2013.01); *E21B 21/003* (2013.01)

(58) Field of Classification Search
None
See application file for complete search history.

(56) References Cited

U.S. PATENT DOCUMENTS

| 4,982,793 | A  | 1/1991  | Holtmyer et al. |
| 5,067,565 | A  | 11/1991 | Holtmyer et al. |
| 5,122,549 | A  | 6/1992  | Holtmyer et al. |
| 5,307,874 | A  | 5/1994  | Lowther |
| 5,363,916 | A  | 11/1994 | Himes et al. |
| 7,036,587 | B2 | 5/2006  | Munoz, Jr. et al. |
| 7,044,220 | B2 | 5/2006  | Nguyen et al. |
| 7,066,258 | B2 | 6/2006  | Justus et al. |
| 7,093,664 | B2 | 8/2006  | Todd et al. |
| 7,096,947 | B2 | 8/2006  | Todd et al. |
| 7,228,904 | B2 | 6/2007  | Todd et al. |

(Continued)

FOREIGN PATENT DOCUMENTS

CA    2640949 C    3/2015

OTHER PUBLICATIONS

The International Search Report and The Written Opinion for PCT/US2022/051844 mailed Apr. 14, 2023.

*Primary Examiner* — Charles R Nold

(57) ABSTRACT

Drill-in fluids disclosed herein comprise an aqueous base fluid, a viscosifier, a fluid loss control additive, and a degradable bridging agent comprising a degradable high strength polymetaphosphate material capable of undergoing an irreversible degradation downhole. The present disclosure further relates to a method for controlling fluid loss through a subterranean surface by using the drill-in fluid for form a filter cake on the subterranean surface. Also provided is a method of degrading a filter cake with an aqueous fluid or aqueous acidic fluid, wherein the filter cake is produced from the drill-in fluid. Further provided is a specific order of addition of constituents of the drill-in fluid, which results in improved filter cake performance and/or filter cake removal.

11 Claims, 1 Drawing Sheet

(56) References Cited

U.S. PATENT DOCUMENTS

| | | |
|---|---|---|
| 7,267,170 B2 | 9/2007 | Mang et al. |
| 7,353,876 B2 | 4/2008 | Savery et al. |
| 7,353,879 B2 | 4/2008 | Todd et al. |
| 7,497,258 B2 | 3/2009 | Savery et al. |
| 7,497,278 B2 | 3/2009 | Schriener et al. |
| 7,506,689 B2 | 3/2009 | Surjaatmadja et al. |
| 7,637,319 B2 | 12/2009 | Savery et al. |
| 7,640,985 B2 | 1/2010 | Savery et al. |
| 7,677,315 B2 | 3/2010 | Saini et al. |
| 7,678,742 B2 | 3/2010 | Munoz, Jr. et al. |
| 7,829,507 B2 | 11/2010 | Todd et al. |
| 8,008,234 B2 | 8/2011 | Panga et al. |
| 8,082,992 B2 | 12/2011 | Todd et al. |
| 8,167,042 B2 | 5/2012 | Todd |
| 8,188,013 B2 | 5/2012 | Mang et al. |
| 8,541,051 B2 | 9/2013 | Saini et al. |
| 8,541,346 B2 | 9/2013 | Todd et al. |
| 8,697,612 B2 | 4/2014 | Todd et al. |
| 8,720,556 B2 | 5/2014 | Todd |
| 8,853,137 B2 | 10/2014 | Todd et al. |
| 8,936,086 B2 | 1/2015 | Liang et al. |
| 9,023,770 B2 | 5/2015 | Todd et al. |
| 9,702,238 B2 | 7/2017 | Reddy et al. |
| 10,119,358 B2 | 11/2018 | Walton et al. |
| 10,352,127 B2 | 7/2019 | Todd et al. |
| 10,876,026 B2 | 12/2020 | De Stefano et al. |
| 2006/0175059 A1 | 8/2006 | Sinclair et al. |
| 2006/0211776 A1 | 9/2006 | Crews |
| 2008/0070808 A1* | 3/2008 | Munoz ............... C09K 8/5086 507/209 |
| 2008/0139416 A1 | 6/2008 | Rimassa et al. |
| 2008/0161212 A1* | 7/2008 | Welton ................. C09K 8/68 507/240 |
| 2009/0008095 A1* | 1/2009 | Duncum ............. C09K 8/502 166/276 |
| 2010/0240802 A1 | 9/2010 | Matzinger et al. |
| 2010/0311621 A1 | 12/2010 | Kesavan et al. |
| 2010/0323932 A1 | 12/2010 | Bustos et al. |
| 2017/0226398 A1 | 8/2017 | Shimaoka et al. |
| 2019/0233706 A1 | 8/2019 | Adewole et al. |
| 2021/0032527 A1 | 2/2021 | Todd |

* cited by examiner

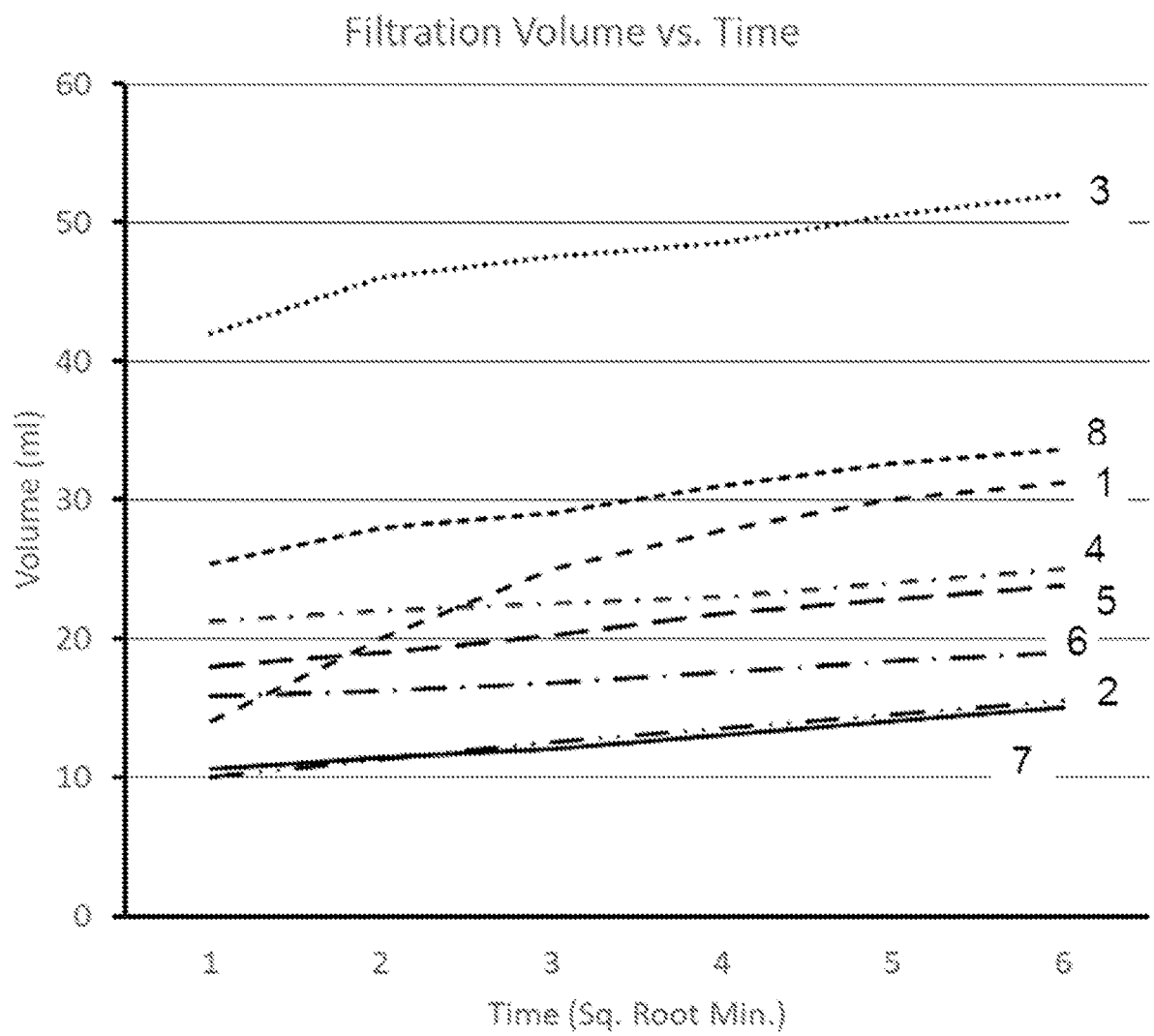

DRILL-IN FLUID COMPOSITIONS AND METHODS

CROSS-REFERENCE TO RELATED APPLICATIONS

This application claims benefit of priority to U.S. Provisional Application No. 63/286,621 filed on Dec. 7, 2021, which is incorporated herein by reference in its entirety.

FIELD OF THE DISCLOSURE

Treatment fluids herein include an aqueous base fluid, a viscosifier, a fluid loss control additive, and a bridging agent comprising a degradable, high strength composition, capable of undergoing irreversible degradation downhole. Methods herein include use of the treatment fluid to deposit a filter cake on a subterranean surface and degradation of a filter cake so deposited using an aqueous fluid or an aqueous acidic fluid. Performance of such treatment fluids can be further improved by order of addition of the constituents of the treatment fluid.

BACKGROUND OF THE DISCLOSURE

At various times during the life of a well in a subterranean formation it is desirable to treat the well. Such treatments can include perforating, gravel packing, fracturing, and acidizing. These treatments generally involve filling the wellbore with a standing or circulating treatment fluid. Although high fluid permeability is an important characteristic of a hydrocarbon-producing formation, these treatments may be adversely affected by loss of treating fluid into the formations.

For example, in an acidizing treatment it is desired to treat the least permeable formation to improve its permeability. However, the formation strata having the highest permeability will most likely consume a major portion of the treatment fluid leaving the least permeable formation strata virtually untreated. During fracturing treatments it is desirable to control loss of the treating fluid to the subterranean formation to maintain sufficient hydraulic pressure to propagate the fracture. During perforating operations, it is desirable to prevent fluids from entering the formation and damaging the formation. During gravel pack operations, it is desirable to recover expensive workover fluids from the wellbore after completion of the operation.

The efficient performance of some treatments of the wellbore require temporarily reducing the permeability of formation to reduce the loss of treating fluid during the treatment. To effect control of the treatment fluids in the wellbore, it is frequently useful to actuate, or otherwise activate or change a configuration of a flow path in a well. For example, it is beneficial to be able to open or close an opening or flow path in a well bore to be able to permit or prevent fluid flow through the flow path, when desired. This is accomplished using a drill-in fluid for deposition of a particulate filter cake in highly permeable portions of a wellbore.

Degradable high strength polymetaphosphate material bridging agents have been in use in subterranean formation treatment fluids for several years. Such bridging material is readily removed from a formation face by contact with an aqueous acidic fluid. Drill-in fluids are typically comprised of an aqueous salt solution or brine viscosified with xanthan gum or a derivatized hydroxyethyl cellulose or the like and including starch or another compound as a fluid loss control agent and particulate calcium carbonate as a bridging agent. The treatment fluid forms a filter cake on the face of the formation and substantially prevents fluid loss to the formation.

Calcium carbonate particulate is readily acid soluble to facilitate removal from the subterranean formation upon completion of the treatment but is of limited strength. Replacement of the calcium carbonate with high strength, starch coated particulate polymetaphosphate material has resulted in improved diversion, but the resultant filter cake of starch coated polymetaphosphate particulate is difficult to remove from the formation face at temperatures below 170° F. (~77° C.) even with acidic fluids.

A continuing need exists for compositions and/or methods for deposition of filter cake having a high strength while in place but also permitting removal of the filter cake with less or no chemicals, which may be damaging to the long-term permeability of the wellbore, and/or in a shorter time period, thus reducing lost production time from the well.

SUMMARY OF THE DISCLOSURE

The present disclosure relates in one aspect to a composition for a drill-in fluid comprising an aqueous base fluid, a viscosifier, a fluid loss control additive, and a degradable, high strength bridging agent, comprising a degradable high strength polymetaphosphate material capable of undergoing an irreversible degradation downhole.

The present disclosure relates in another aspect to a method for reducing fluid loss through a subterranean surface. The method comprises providing a treatment fluid, filling a cavity in a subterranean formation with the treatment fluid, pressurizing the treatment fluid in the cavity, and forming a filter cake on the subterranean surface. In some embodiments, the treatment fluid comprises an aqueous base fluid, a viscosifier, a fluid loss control additive, and a bridging agent comprising a degradable, high strength composition. The cavity in a subterranean formation is defined by the subterranean surface. The treatment fluid in the cavity is pressurized to induce fluid loss from the cavity through the subterranean surface, thereby forming a filter cake on the subterranean surface.

The present disclosure relates in another aspect to a method for degrading a filter cake. The method comprises providing a filter cake produced from a drill-in fluid, and degrading the filter cake with an aqueous degrading fluid. The drill-in fluid comprises an aqueous base fluid, a viscosifier, a fluid loss control additive, and a bridging agent comprising a degradable, high strength composition.

The present disclosure relates in another aspect to a method for preparing a drill-in fluid. The method comprises adding a fluid loss control additive to water under mixing conditions to form a first mixture, adding a viscosifier to the first mixture under mixing conditions, which may be the same or different than the previous mixing conditions, to form a second mixture, and adding a bridging agent comprising a degradable, high strength composition to the second mixture under mixing conditions, which may be the same or different than either or both of the previous mixing conditions, to form a third mixture.

The foregoing has outlined rather broadly the features and technical advantages of the present disclosure in order that the detailed description of the presently disclosed methods and materials that follows may be better understood. Additional features and advantages of the present disclosure will be described hereinafter, which form the subject matter of the claims of the invention. It should be appreciated by those skilled in the art that the conception and specific embodiments disclosed may be readily utilized as a basis for modifying or designing other processes for carrying out the same purposes of the presently disclosed methods and materials. It should also be realized by those skilled in the art that such equivalent methods do not depart from the spirit and scope of the presently disclosed methods and materials as set forth in the appended claims. The novel features which are believed to be characteristic of the invention, both as to its composition, method of use, and method of manufacture, together with further objects and advantages, will be better understood from the following description.

BRIEF DESCRIPTION OF THE DRAWINGS

The present disclosure is illustrated by way of example, and not by way of limitation, in the accompanying FIGURE, in which:

The FIGURE shows a graphical comparison of fluid loss performance for filter cake prepared using either gelatin or starch for the fluid loss control additive to show performance differences for different fluid loss control additives, different amounts of fluid loss control additive, and different drill-in fluid preparation methods. Discussion of The FIGURE can be found in the EXAMPLES section below.

DETAILED DESCRIPTION OF THE DISCLOSURE

Illustrative embodiments of the subject matter claimed below will now be disclosed. In the interest of clarity, some features of some actual implementations may not be described in this specification. It will be appreciated that in the development of any such actual embodiments, numerous implementation-specific decisions can be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

Definitions

"Bridging agent", as used herein, means one or more solids added to a treatment fluid such as a drilling or drill-in fluid, wherein the solid(s) bridge across a cavity such as a pore throat or fractures of an exposed rock, thereby aiding in the building of a filter cake to prevent loss of fluids through the cavity.

"Completion fluid," as used herein, means a liquid substantially free (greater than at least 95%) of solids used to "complete" an oil or gas well. This fluid is placed in the well to facilitate final operations prior to initiation of production, such as setting screens production liners, packers, or downhole valves or shooting perforations into the producing zone. Completion fluid is meant to control a well should downhole hardware fail, without damaging the producing formation or completion components. Completion fluids are typically brines (chlorides, bromides and formates), but could be any fluid of proper density and flow characteristics. The fluid should be chemically compatible with the reservoir formation and fluids, and may be filtered to a high degree to avoid introducing solids to the near-wellbore area. A regular drilling fluid is not suitable for completion operations due to its solids content, pH and ionic composition. Drill-in fluids can, in some cases, be suitable for completion purposes.

"Degradation" (including its other form, such as "degrade" or "degradable"), as used herein, refers to a transition, naturally or induced, of an initial chemical composition to a second chemical composition. This transition can be the result of chemical reactions, thermal reactions, or a combination of both. Degradation may refer to both of the relatively extreme cases of passive, hydrolytic degradation that the degradable material may undergo, i.e., heterogeneous (or bulk) erosion, homogeneous (or surface) erosion, and combination of these two erosion mechanisms. The second chemical composition that results from the initial chemical composition may be referred to as the "degradation" products. For example, with respect to bridging agents described herein, degradation refers to decomposition or disintegration of the bridging agent into at least one degradation product, and hence the decomposition or disintegration of the filter cake. In some examples, the degradation product of a polymetaphosphate material contains at least 1 wt. % of an orthophosphate. In some examples, the degradation product contains from about 1 wt. % to about 100 wt. % of an orthophosphate and other degradation products.

"Drill-in fluid," as used herein, means a fluid for treatment of a wellbore comprising water, water with salt in solution, or brine containing only selected solids, such as bridging agents, of appropriate particle size ranges (including, but not limited to, salt crystals, calcium carbonate, or polymetaphosphate) and polymers. Only additives essential for filtration control and cuttings carrying are present in a drill-in fluid. Drill-in fluids are engineered to lay down a filter cake that will block both fluid filtrate and drill solids from escaping the wellbore in the formation.

"Drilling fluid," as used herein, means a fluid, or mud, designed for drilling through the reservoir section of a wellbore. The reasons for using such a specially designed fluid/mud are to successfully drill the reservoir zone, including long, horizontal drain holes, to minimize damage to and thus maximize production from exposed zones, and to facilitate the well completion.

"Efficient," as used herein, in reference to filter cake, means a filter cake comprising an amount of material that is required to provide a desired level of fluid loss control from the surface of the formation to which the filter cake is deposited. In some embodiments, the permeability of a surface is reduced by an efficient filter cake to reflect a fluid loss rate of less than or equal to 20 mL in tests conducted according to the procedures set forth by API Recommended Practice 13.

"Filter cake contaminant," as used herein, means a material or component that can adversely affect one or more components in a drill-in fluid, where an adverse effect on the one or more components means that formation of the filter cake will be hindered and/or the filter cake formed is less effective. Filter cake contaminants include materials that are not degradable as described herein, including, but are not limited to, sand, calcium carbonate, barite, ceramic proppants, and bentonite.

"Filter cake," as used herein, means particulate filter cake, which is the residue deposited on a permeable surface when a slurry, such as a drill-in fluid, is forced against a permeable surface under pressure. As the slurry containing particles of different sizes if forced through the pores of the permeable surface, the larger particles of the slurry are caught in the pores of the permeable surface to form the skeleton of the filter cake and the smaller particles can migrate into and deposit within the porous cake formed by the larger particles. Filtrate is the liquid that passes through the permeable surface, leaving the cake on the permeable surface.

"Fluid loss control additive," as used herein, means starches, polyvinyl acetates, polylactic acid, guar and other polysaccharides, gelatins, and the like used in a drill-in fluid to form particulate filter cake having a reduced permeability for use in a high permeability formation such as, but not limited to sandstone. Use of such materials in hydraulic fracturing fluid are also termed as fluid loss control additives when used in a hydraulic fracturing fluid but have a different functionality in the formation of wall-building filter cake. There are a range of formation permeabilities in regions of a borehole subject to hydraulic fracturing such that permeabilities are high enough to suffer from the loss of base fluid (water or brine) from the fracturing fluid into the formation but low enough that polymers such as starches, polyvinyl acetates, polylactic acid, guar and other polysaccharides, gelatins, and the like will filter-out of the fracturing fluid to form a filter cake referred to as wall-building.

"Formation," as used herein, means underground rock formation from which oil, gas or water is produced. Any porous rock will contain fluids of some sort, and all rocks at considerable distance below the Earth's surface will initially be under pressure, often related to the hydrostatic column of ground waters above the reservoir.

"Gelatin," as used herein, means a mixture of water-soluble peptides and proteins derived from the partial hydrolysis of collagen, and can vary slightly depending on the source of collagen, e.g. tissue type, species, animal. Collagen undergoes either acidic or alkaline pretreatments, leading to two types of gelatin: type A (acidic hydrolysis) and type B (basic hydrolysis). Either type of gelatin can be used in the presently disclosed embodiments.

"High strength," as used herein, with respect to bridging agents, means having a Mohs hardness greater than 3, 3.5, 4.0, or 4.4. In some embodiments, any one of these minimums can be in combination with an upper range limit selected from any one of less than or equal to 7, 6.5, 6, or 5.5.

"Irreversible," as used herein, with respect to degrading bridging agents, means that the degradable material, once degraded, does not recrystallize or reconsolidate while downhole. The degradable material should degrade in situ (in the wellbore) and should not recrystallize or reconsolidate in situ (in the wellbore or the formation).

"Pill," as used herein, means any relatively small quantity (less than 200 barrels) of a blend of drilling fluid to accomplish a specific task that the regular drilling fluid cannot perform such as, but not limited to: high-viscosity pills to help lift cuttings out of a vertical wellbore, freshwater pills to dissolve encroaching salt formations, pipe-freeing pills to destroy filter cake and relieve differential sticking forces, and lost circulation material pills to plug a leaking zone.

The present disclosure utilizes condensed polyphosphate materials that have either linear or cyclic structures, in particular "polymetaphosphate". "Polymetaphosphate," as used herein, means a mixed cationic polyphosphate material with a monovalent alkali metal and a second, preferable divalent, metal, such as that described in Mehrotra's "Synthesis And Properties Of Simple And Complex Polymetaphosphate Glasses Of Alkali Metals" (1975). In some embodiments, the polymetaphosphate has the general formula of: $[XM(PO_3)_3]_n$, wherein:

X is an alkali metal selected from a group consisting of Li, Na or K;

M is a divalent metal selected from a group consisting of Be, Mg, Ca, Zn, Pb, Cu or Ni; and, n is a positive integer greater than 1, or from about 1 to about 200, or even greater.

Such polymetaphosphate material can be prepared according to Reaction 1:

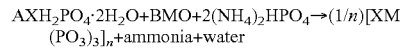

wherein A and B are numbers of moles of reactants and the ratio of A:B is in the range of from about 1:1 to about 6:1.

Polymetaphosphates of the present disclosure can be crystallize in the triclinic (space group P-1) crystal structure, which is made up of apex-linked phosphate tetrahedra which form infinite $(PO_3)_2^{n-1}$ chains with three crystallographically unique P sites in the chain. $X^{1+}$ and $M^{2+}$ ions are located between the chains and can coordinate to six and eight terminal oxygens on adjacent chains.

"Self-degrading," as used herein, with respect to filter cake, means the filter cake can be removed without the need to circulate a separate "clean-up" solution or "breaker" through the wellbore. Although "self-degrading filter cakes" formed by the drill-in fluids disclosed herein can be removed without the need for acid treatment, an operator may nevertheless elect to circulate a separate clean up solution through the well bore when the operator desires to hasten the rate of degradation of the filter cake. In some embodiments, the bridging agents of the present disclosure are sufficiently acid-degradable as to be removed by such treatment. In some embodiments, the degrading agent comprises water and an aqueous acidic fluid such as about 5 to 15% HCl, however acetic acid and other acidic fluids also may be employed. "Self-degrading" is a subset and included within "degrading"—i.e. all self-degrading filter cakes are degradable filter cakes, but only some degradable filter cakes are self-degrading. Filter cake degradation can be accomplished by degrading either or both the bridging agent and the fluid loss control additive with water. Degradation of either or both the bridging agent and the fluid loss control additive can be accelerate using an aqueous acidic fluid. In some embodiments, filter cake degradation can occur at typical wellbore temperatures, such as less than or equal to 180° F. (~82° C.), 170° F. (~77° C.), 160° F. (~71° C.), or 150° F. (~66° C.).

"Starch", as used herein, refers to a fluid loss control additive that is a polysaccharide with the general formula $(C_6H_{10}O_5)_n$. The starches used in the presently described disclosure consists of about 20-27% linear polymer (amylose) and about 73-80% branched polymer (amylopectin), and can be derived from sources such as corn/maize, wheat, oats, rice, potatoes, yucca and similar plants and vegetables.

Drill-in Fluid Composition

Drill-in fluids disclosed herein comprise an aqueous base fluid, a viscosifier, a fluid loss control additive, and a bridging agent comprising a degradable, high strength composition. Optionally, the drill-in fluids can comprise a salt, additional particulates and/or additives commonly used in drill-in fluids.

a. Aqueous Base Fluid

The aqueous-base fluid component of the drill-in fluid is selected from fresh water, saltwater, brine (e.g., saturated saltwater), seawater, or any combination thereof. Generally, the water may be from any source provided that it is substantially free of any filter cake contaminants. In some embodiments, the aqueous-base fluid is present in the drill-in fluids in an amount in the range of from greater than 25 wt. % to about 97 wt. %, or from about 60 wt. % to about 90 wt. %, or from about 80 wt. % to about 87 wt. %, wherein the weight percentages are based on the total weight of the drill-in fluid.

b. Salt

In some embodiments, a salt such as, but not limited to, calcium chloride is added to the drill-in fluid as disclosed herein to retard the dissolution of the bridging agent. In some embodiments, the amount of salt added is less than or equal to 5 wt. % of the first mixture. Alternatively, the amount of salt is between greater than 0 wt. % and less than about 5. wt % of the total weight of the drill-in fluid.

Viscosifier

A variety of viscosifiers may be included in the drill-in fluids of the present disclosure. Examples of viscosifiers include, but are not limited to: biopolymers, such as xanthan and succinoglycan; cellulose derivatives, such as hydroxyethyl cellulose; and guar and its derivatives, such as hydroxypropyl guar. Combinations and derivatives of these are suitable as well. In some embodiments, the viscosifier is xanthan.

The viscosifier is present in the drill-in fluids of the present disclosure in an amount sufficient to suspend the bridging agent and drill cuttings in the drill-in fluid. In some embodiments, the viscosifier is present in the drill-in fluids in an amount in the range of from 0.01 wt. % to about 1.5 wt. % or from 0.10 wt. % to about 0.7 wt. %, wherein the weight percentages are based on the total weight of the drill-in fluid. In some embodiments, the viscosifier is present in the drill-in fluids in an amount in the range of from 0.01 wt. % to about 1.5 wt. % or from 0.10% wt. % to about 0.7 wt. %, wherein the weight percentages are based on the total weight of the aqueous base fluid, salt (if added), fluid loss control additive, and viscosifier.

c. Fluid Loss Control Additive

The fluid loss additive useful in the drill-in fluid includes, but is not limited to, one or more gelatins. After introducing the fluid loss control additive into a portion of the subterranean formation with the drill-in fluid of the present disclosure, it is believed, without wishing to be limited, that the additive builds a suitable filter cake upon the formation surfaces that define cavities within the subterranean formation. The filter cake is made up of both the bridging particles and the fluid loss control additive. In some embodiments, bridging particles are on the order of the rock pore throat size and bridge across these openings, and the size of the filtration aid is on the order of the pore throats of the pack of bridging particles and makes the final seal to the desired level of fluid loss control.

The filter cake so formed reduces the permeability of the portion of the subterranean formation to aqueous fluids without substantially changing the ability to remove the filter cake by degrading the bridging agent with aqueous fluids and/or aqueous acidic fluids. In some embodiments, the permeability is reduced to reflect a fluid loss rate of less than or equal to 20 mL in tests conducted according to the procedures set forth by API Recommended Practice 13. Additionally, in some embodiments, the fluid loss additive may also facilitate suspension of the bridging agents in the drill-in fluids.

Sufficient concentrations of the fluid loss control additive should be present in the drill-in fluids to provide the desired degree of fluid loss control, particulate suspension, and/or viscosity enhancement. In some embodiments, the fluid loss control additive should be included in the fluids of the present disclosure in an amount in the range of from about 0.5 wt. % to 5 wt. %, or from 1 wt. % to 4 wt. %, based on the total weight of the drill-in fluid. In some embodiments, the fluid loss control additive should be included in the fluids of the present disclosure in an amount in the range of from about 0.5 wt. % to 5 wt. %, or from 1 wt. % to 4 wt. %, based on the total weight of the aqueous base fluid, salt (if added), and fluid loss control additive.

d. Bridging Agent

The drill-in fluid further comprises a bridging agent comprising a degradable, high strength composition. In some embodiments, the bridging agent is a particulate polymetaphosphate such as described in U.S. Pat. No. 10,352,127, entitled "High Strength Dissolvable Compositions for Use in Subterranean Wells," which is fully incorporated by reference herein.

In some embodiments, alone or in combination with one or more of the foregoing attributes of the method for preparing a drill-in fluid, the bridging agent comprises a polymetaphosphate material of the general formula of $[XM(PO_3)_3]_n$ and/or prepared by the following reaction:

$$AXH_2PO_4 \cdot 2H_2O + BMO + 2(NH_4)_2HPO_4 \rightarrow (1/n)[XM(PO_3)_3]_n + \text{ammonia} + \text{water}$$

wherein:

A and B are numbers of moles of reactants and the ratio of A:B is in the range of from about 1:1 to about 6:1;

X is selected from Li, Na or K;

M is a divalent metal selected from Be, Mg, Ca, Zn, Pb, Cu or Ni; and n is a positive integer greater than 1, or from 1 to about 200, or even greater.

In some embodiments, the polymetaphosphate is $[NaMg(PO_3)_3]_n$, $[NaCa(PO_3)_3]_n$, or combinations thereof. In other embodiments, the polymetaphosphates of the present disclosure are crystallize in the triclinic (space group P-1) crystal structure, as described in Abrahams "Structures of the chain metaphosphates $NaM(PO_3)_3$ (M=Ca or Sr)" (2007), which is fully incorporated by reference herein. The triclinic crystal structure is made up of apex-linked phosphate tetrahedra which form infinite $(PO_3)_n^{n-1}$ chains with three crystallographically unique P sites in the chain. $X^{1+}$ ions, such as sodium, and $M^{2+}$ ions, such as calcium or magnesium, are located between the chains and can coordinate to six and eight terminal oxygens on adjacent chains.

The polymetaphosphate particulate material used in the presently disclosed fluids and methods has a hardness greater than 3 on the Mohs hardness scale; alternatively, it has a hardness that is greater than 3 and less than 7; alternatively, it has a hardness that is greater than 3.5 and less than 6.5; alternatively, it has a hardness that is greater than 3 and less than 5; or, it has a hardness that is greater than 4 and less than 7.

In some embodiments, the polymetaphosphate particulate has a particle size distribution of from 5 mesh (~4 mm diameter) to 100 mesh (~0.149 mm diameter) on the US Sieve Series scale (all particle sizes are based on the US Sieve Series scale unless otherwise noted). In some embodiments, the polymetaphosphate particulate has a particle size distribution which results in three fractions comprising the bridging agent. The largest particles should have a particle size in the range of 6-20 mesh (~3.36 mm-0.841 mm) and comprise from 15 wt. % to 45 wt. % of the particles, based on the total weight of the bridging agent. The medium particles should be in the range of from finer than 20 to 70 mesh (~0.841 mm to 0.210 mm) and comprise from 20 wt. % to 45% wt. % of the particles, based on the total weight of the bridging agent, and the fine particles should be finer than 70 mesh (0.210 mm) and comprise from 15 wt. % to 40 wt. % of the particles, based on the total weight of the bridging agent. In some embodiments, the polymetaphosphate particulate material is $[NaMg(PO_3)_3]_n$, $[NaCa(PO_3)_3]_n$, or combinations thereof, and has the above described three fractions of particle size distribution.

In some embodiments, the polymetaphosphate particulate material degrades into a degradation product having at least 1 wt. % of an orthophosphate.

In some embodiments, the degradable bridging agent is present in the drill-in fluid in an amount sufficient to create an efficient filter cake. In some embodiments, the degradable, high strength bridging agent is present in the drill-in fluid in an amount ranging from 3 wt. % to 30 wt. %, or from 6 wt. % to 15 wt. %, based on the total weight of the drill-in fluid. In some embodiments, the degradable, high strength bridging agent is present in the drill-in fluid in an amount ranging from 3 wt. % to 30 wt. %, or from 6 wt. % to 15 wt. %, based on the total weight of the on the total weight of the aqueous base fluid, salt (if added), fluid loss control additive, viscosifier, and degradable, high strength bridging agent.

In certain embodiments, the bridging agent is present in the drill-in fluids in an amount sufficient to provide a fluid loss of less than or equal to 20 ml in tests conducted according to the procedures set forth by API Recommended Practice (RP) 13. One of ordinary skill in the art, with the benefit of this disclosure and provided with relevant wellbore information, will recognize an optimum concentration of degradable material that provides desirable values in terms of enhanced ease of removal of the filter cake at the desired time without undermining the stability of the filter cake during its period of intended use. Relevant wellbore information include the type of rock in the relevant formation and the temperature in the wellbore at the relevant location.

e. Optional Components

The drill-in fluids of the present disclosure optionally comprise gravel particulates suitable for use in subterranean applications. Gravel particulates include, but are not limited to, gravel, natural sand, quartz sand, particulate garnet, glass, ground walnut hulls, nylon pellets, aluminum pellets, bauxite, ceramics, and polymeric materials, and combinations thereof. One having ordinary skill in the art will recognize the particulate type, size, and amount to use in conjunction with the fluids of the present disclosure to achieve a desired result. In certain embodiments, the gravel particulates used may be included in the fluids to form a gravel pack downhole. In some embodiments, the gravel particulates may be coated with a resin or tackifying composition, wherein the gravel particulates may form hard, permeable masses in the formation, inter alia, to reduce the migration of formation particulates with the aid of the treatment fluid to reduce fluid loss and initially form the pack within the wellbore.

Additional additives may be added to the fluids of the present disclosure as deemed appropriate for a particular application. Examples of such additives include, but are not limited to, weighting agents, surfactants, scale inhibitors, antifoaming agents, biocides, bactericides, salts, foaming agents, gel breakers, shale swelling inhibitors, and combinations thereof, provided such additives to not act as filter cake contaminants.

Fluid Loss Control

The present disclosure relates in another aspect to a method for reducing fluid loss through a subterranean surface. The method comprises providing a treatment fluid, filling a cavity in a subterranean formation with the treatment fluid, pressurizing the treatment fluid in the cavity, and forming a filter cake on the subterranean surface. In some embodiments, the treatment fluid comprises an aqueous base fluid, a viscosifier, a fluid loss control additive, and a bridging agent comprising a degradable, high strength composition. The cavity in a subterranean formation is defined by the subterranean surface. The treatment fluid in the cavity is pressurized to induce fluid loss from the cavity through the subterranean surface, thereby forming a filter cake on the subterranean surface.

The bridging agent becomes suspended in the drill-in fluid and, as the drill-in fluid begins to form a filter cake within the subterranean formation, the bridging agent becomes distributed in the resulting filter cake. In some embodiments, the bridging agent is distributed uniformly in the filter cake. In some embodiments, the filter cake forms upon the surface of the formation itself, upon a sand screen, upon a gravel pack, or upon another suitable surface within the subterranean formation or well bore, wherein the suitable surface defines a cavity within the formation.

In some embodiments, in combination with the foregoing attributes of the method for reducing fluid loss through a subterranean surface, the bridging agent comprises a polymetaphosphate material.

In some embodiments, alone or in combination with one or more of the foregoing attributes of the method for reducing fluid loss through a subterranean surface, the bridging agent comprises particles having a particle size in the range of from 5 to 100 mesh (~4 mm to ~0.149 mm). In other embodiments, the bridging agent has 15 wt. % to 45 wt. % of the particles in the range of from 6 mesh to 20 mesh (~3.36 mm-0.841 mm), 20 wt. % to 45 wt. % of the particles in the range of from finer than 20 mesh to 70 mesh (~0.841 mm to 0.210 mm), and 15 wt. % to 40 wt. % of the particles finer than 70 mesh (<0.210 mm), wherein all weight percentages are based on the total weight of all particles. In some embodiments, alone or in combination with one or more of the foregoing attributes of the method for reducing fluid loss through a subterranean surface, the bridging agent is capable of undergoing heterogeneous and/or homogeneous degradation downhole. In some embodiments, alone or in combination with one or more of the foregoing attributes of the method for reducing fluid loss through a subterranean surface, the bridging agent is capable of undergoing irreversible degradation downhole.

In some embodiments, alone or in combination with one or more of the foregoing attributes of the method for reducing fluid loss through a subterranean surface, the aqueous base fluid comprises a salt. In some embodiments, alone or in combination with one or more of the foregoing attributes of the method for reducing fluid loss through a subterranean surface, the aqueous base fluid is substantially free of filter cake contaminants.

In some embodiments, alone or in combination with one or more of the foregoing attributes of the method for reducing fluid loss through a subterranean surface, the viscosifier comprises one or more members selected from the group consisting of biopolymers, cellulose and its derivatives, and guar and its derivatives.

In some embodiments, alone or in combination with one or more of the foregoing attributes of the method for reducing fluid loss through a subterranean surface, the fluid loss control additive is one or more gelatins.

In some embodiments, alone or in combination with one or more of the foregoing attributes of the method for reducing fluid loss through a subterranean surface, the pressurizing is carried out to a pressure in the range of from 50 psig (~0.34 MPa) to 1,000 psig (~6.89 MPa).

In some embodiments, alone or in combination with one or more of the foregoing attributes of the method for reducing fluid loss through a subterranean surface, the subterranean surface is defined by one or more members selected from the group consisting of a wellbore, a sand screen, and a gravel pack.

In some embodiments, alone or in combination with one or more of the foregoing attributes of the method for reducing fluid loss through a subterranean surface, the fluid loss rate is less than or equal to 20 mL in tests conducted according to the procedures set forth by API Recommended Practice 13.

a. Delivery of Fluid

In other embodiments, the fluids of the present disclosure may be placed into a well bore as a pill either prior to or after the stabilization of unconsolidated formation particulates in a section of the subterranean formation penetrated by a well bore. The formation particulates may be stabilized by any suitable technique, including gravel packing and frac packing. The desired volume of the fluid of the present disclosure introduced into the well bore is based on several properties of the section to be treated, such as depth and volume of the section, as well as permeability and other physical properties of material in the section. The fluid loss control additive included in the fluid of the present disclosure will build a filter cake within the subterranean formation during normal leak off from the fluid placed into the well bore. The presence of the water-soluble fluid loss control additive on the gravel particulates and/or in the formation may reduce the permeability of those areas to aqueous-based fluids without substantially changing the permeability to hydrocarbons. This may reduce fluid loss into the formation from other fluids (e.g., carrier fluids or completion fluids) that may be introduced into the well bore subsequent to the treatment fluid.

b. Post-Perforating Fluid Loss Pill

In another embodiment, the drill-in fluids disclosed herein are used as a post-perforating fluid loss pill. In high permeability sandstone, some type of sand control treatment must be performed, which involves running an assembly consisting of screens, closing sleeve, blank pipe, and packers. A typical sequence of a sand control procedure will involve steps such as:

1. Run in to hole with perforating assembly
2. Perforated the zone
3. Spot a post-perforating fluid loss pill
4. Come out of hole with the perforating assembly
5. Make up and run in hole with sand control bottom hole assembly
6. Spot acid to break down the post-perforating fluid loss pill
7. Perform sand control treatment Filter Cake Removal The present disclosure relates in another aspect to a method for degrading a filter cake. The method comprises providing a filter cake produced from a drill-in fluid, and degrading the filter cake with an aqueous degrading fluid. The drill-in fluid comprises an aqueous base fluid, a viscosifier, a fluid loss control additive, and a bridging agent comprising a degradable, high strength composition.

After the requisite time period dictated by the subterranean formation treatment being performed, the degradable bridging agent degrades and/or is intentionally degraded. This degradation, in effect, causes the degradable bridging agent to be removed from the filter cake. In some embodiments, substantially all of the bridging agent in the filter cake is degraded. As a result, voids are created in the filter cake and the filter cake tends to be removed from the surface of the formation by fluid flow or dissolution of the components. In some embodiments, removal of the degradable bridging agent from the filter cake allows produced fluids to flow more freely from the formation, or to substantially the same rate as would have been possible had the filter cake never been deposited on the surface.

In some embodiments, in combination with the foregoing attributes of the method for degrading a filter cake, the bridging agent comprises a polymetaphosphate material.

In some embodiments, alone or in combination with one or more of the foregoing attributes of the method for degrading a filter cake, the bridging agent comprises particles having a particle size in the range of from 5 to 100 mesh (~4 mm to ~0.149 mm). In some embodiments, alone or in combination with one or more of the foregoing attributes of the method for degrading a filter cake, the bridging agent comprises 15 wt. % to 45 wt. % of the particles have a particle size in the range of from 6 mesh to 20 mesh (~3.36 mm-0.841 mm), 20 wt. % to 45 wt. % of the particles have a particle size in the range of from finer than 20 mesh to 70 mesh (~0.841 mm to 0.210 mm), and 15 wt. % to 40 wt. % of the particles have a particle size finer than 70 mesh (<0.210 mm), wherein all weight percentages are based on the total weight of all particles. In some embodiments, alone or in combination with one or more of the foregoing attributes of the method for degrading a filter cake, the bridging agent is capable of undergoing heterogeneous and/or homogeneous degradation downhole. In some embodiments, alone or in combination with one or more of the foregoing attributes of the method for degrading a filter cake, the bridging agent is capable of undergoing irreversible degradation downhole.

In some embodiments, alone or in combination with one or more of the foregoing attributes of the method for degrading a filter cake, the aqueous base fluid comprises a salt. In some embodiments, alone or in combination with one or more of the foregoing attributes of the method for degrading a filter cake, the aqueous base fluid is substantially free of filter cake contaminants.

In some embodiments, alone or in combination with one or more of the foregoing attributes of the method for degrading a filter cake, the viscosifier comprises one or more members selected from the group consisting of biopolymers, cellulose and its derivatives, and guar and its derivatives.

In some embodiments, alone or in combination with one or more of the foregoing attributes of the method for degrading a filter cake, the fluid loss control additive is one or more gelatins.

In some embodiments, alone or in combination with one or more of the foregoing attributes of the method for degrading a filter cake, the aqueous degrading fluid comprises an acid. In some embodiments, alone or in combination with one or more of the foregoing attributes of the method for degrading a filter cake, the acid comprises hydrochloric acid and/or acetic acid.

In some embodiments, alone or in combination with one or more of the foregoing attributes of the method for degrading a filter cake, the filter cake resides on a subterranean surface.

In some embodiments, alone or in combination with one or more of the foregoing attributes of the method for degrading a filter cake, the filter cake is degraded at an average daily rate of greater than or equal to 4 wt. %, 20 wt. %, 50 wt. %, 75 wt. %, or 99 wt. %, wherein the weight percent is based on the total weight of filter cake deposited on a selected area of a wellbore.

With the current technology, the soak time needed to break down the post-perforating fluid loss pill can take at least 6 to 8 hours and sometimes even longer. On an offshore rig where time is money, this can be very expensive. There is an effective post-perforating fluid pill that can be broken down more quickly.

There are currently at least two formulation types of fluid loss pills. One is a crosslinked hydroxyethyl cellulose ("HEC") and the other is a particulate based system. Generally, the particulate based system functions where the particles are sized to bridge on the pore throats of the sandstone formation and are acid soluble. A carrier fluid such as xanthan is used and starch is added to act as a filtration aid to promote better fluid leak off control. In either formulation, the soak time required for 15% hydrochloric acid solution to break down the crosslinked HEC or the starch is very long. In the case of starch at temperatures below 180° F. (~82° C.), it may not be possible to break down the starch without a 24-hour soak time.

In one embodiment, a drill-in fluid for use in a fluid loss pill as disclosed herein includes polyphosphate bridging particles and adds a salt such as, but not limited to, calcium chloride to retard the dissolution of the polyphosphate material. Gelatin is used in place of the starch as a fluid loss control additive, resulting in a system where the filter cake could be removed with just 1 hour of soak time. In order for the gelatin to have similar filtration fluid loss performance to starch, a specific mixing procedure is used.

Preparation of Drill-in Fluid

The present disclosure relates in another aspect to a method for preparing a drill-in fluid. The method comprises adding a fluid loss control additive to water under mixing conditions to form a first mixture, adding a viscosifier to the first mixture under mixing conditions, which may be the same or different than the previous mixing conditions, to form a second mixture, and adding a bridging agent comprising a degradable, high strength composition to the second mixture under mixing conditions, which may be the same or different than either or both of the previous mixing conditions, to form a third mixture.

In some embodiments, in combination with the foregoing attributes of the method for preparing a drill-in fluid, a salt is added in the same addition step as the fluid loss control additive. The salt can be added before the fluid loss control additive, after the fluid loss control additive, or concurrently with the fluid loss control additive. Better results can be achieved adding the salt before the fluid loss control additive. In some embodiments, alone or in combination with one or more of the foregoing attributes of the method for preparing a drill-in fluid, the amount of salt added is less than or equal to 5 wt. % of the first mixture. In some embodiments, alone or in combination with one or more of the foregoing attributes of the method for preparing a drill-in fluid, first mixing conditions when the salt is added are sufficient to cause the salt to dissolve and go into solution.

In some embodiments, alone or in combination with one or more of the foregoing attributes of the method for preparing a drill-in fluid, the fluid loss control additive is added at a rate sufficient to control foaming of the first mixture. In some embodiments, alone or in combination with one or more of the foregoing attributes of the method for preparing a drill-in fluid, the amount of fluid loss control additive added is in the range of from 0.5 wt. % to 5 wt. %, based on the weight of the first mixture. In some embodiments, alone or in combination with one or more of the foregoing attributes of the method for preparing a drill-in fluid, the fluid loss control additive is one or more gelatins.

In some embodiments, alone or in combination with one or more of the foregoing attributes of the method for preparing a drill-in fluid, mixing conditions in the step where the viscosifier is added are sufficient to cause the viscosifier to dissolve and go into solution. In some embodiments, alone or in combination with one or more of the foregoing attributes of the method for preparing a drill-in fluid, the viscosifier is added at a rate sufficient to control clumping in the second mixture. In some embodiments, alone or in combination with one or more of the foregoing attributes of the method for preparing a drill-in fluid, the amount of the viscosifier added is in the range of from about 0.01 wt. % to about 1.5 wt. % based on the weight of the second mixture. In some embodiments, alone or in combination with one or more of the foregoing attributes of the method for preparing a drill-in fluid, the viscosifier comprises one or more members selected from the group consisting of biopolymers, cellulose and its derivatives, and guar and its derivatives.

In some embodiments, alone or in combination with one or more of the foregoing attributes of the method for preparing a drill-in fluid, the bridging agent comprises a polymetaphosphate material.

In some embodiments, alone or in combination with one or more of the foregoing attributes of the method for preparing a drill-in fluid, the bridging agent comprises particles having a particle size in the range of from 5 to 100 mesh (~4 mm to ~0.149 mm). In some embodiments, alone or in combination with one or more of the foregoing attributes of the method for preparing a drill-in fluid, 15 wt. % to 45 wt. % of the particles have a particle size in the range of from 6 mesh to 20 mesh (~3.36 mm-0.841 mm), 20 wt. % to 45 wt. % of the particles have a particle size in the range of from finer than 20 mesh to 70 mesh (~0.841 mm to 0.210 mm), and 15 wt. % to 40 wt. % of the particles have a particle size finer than 70 mesh (<0.210 mm), wherein all weight percentages are based on the total weight of all particles. In some embodiments, alone or in combination with one or more of the foregoing attributes of the method for preparing a drill-in fluid, the bridging agent is capable of undergoing heterogeneous and/or homogeneous degradation downhole. In some embodiments, alone or in combination with one or more of the foregoing attributes of the method for preparing a drill-in fluid, the bridging agent is capable of undergoing irreversible degradation downhole. In some embodiments, alone or in combination with one or more of the foregoing attributes of the method for preparing a drill-in fluid, the mixing conditions for the step where the bridging agent is added are sufficient to cause the bridging agent to be substantially homogeneously distributed in the third mixture. In some embodiments, alone or in combination with one or more of the foregoing attributes of the method for preparing a drill-in fluid, the amount of the bridging agent added is in the range of from 3 wt. % to 30 wt. % based on the weight of the third mixture.

A mixing procedure for an embodiment of the gelatin-based post-perorating fluid loss pill is given below. The amounts below are based on making a "lab barrel" of fluid. A "lab barrel" is a mixed volume of 350 mL. This results in additives that are measured out by weight in grams in the "lab barrel" being numerically equal to the pounds of material per field barrel, making conversion of lab units to field units very straight forward.

Detailed Mixing Procedure (1) Measure out materials to make a 350 mL fluid volume:
  327 mL fresh water
  6 g CaCl$_2$) anhydrous
  7 g Gelatin (Knox Unflavored Gelatin)
  0.7 g Xanthan (ZANFLO available from Kelco Oil Field Group)
  20 g ULT-100 25 micron (from LyondellBasell)
  20 g ULT-100 5 micron (from LyondellBasell)
(2) Add water to a suitable mixing container
(3) Set mixer at moderate speed (30 setting on a PowerStat Model 116B connected to a Hamilton Beach Overhead "Malt" mixer)
(4) Add CaCl$_2$, let material dissolve and go into solution completely
(5) Add Gelatin, slowly sprinkling material into solution. Adding too much too fast can cause the solution to start foaming and have worse filtration numbers. Add about 10 to 20% of the material in steps, waiting in between long enough to allow the gelatin to mix in completely. Waiting about 1 minute between additions works well.
(6) Add Xanthan next, slowly sprinkling material over solution, xanthan will clump up if added to fast, let stir until xanthan is in solution. The xanthan should be continuously sprinkled in over a 2 to 3 minute time frame.
(7) Let system set static for 30 minutes
(8) Add the ULT-100 to the system stirring at a little faster speed (about 45 setting) so the material is evenly distributed
(9) Place a 20 micron filtration disk (Ofite™ part number 170-53-3, Material #09120) in a Ofite™ HPHT Cell.
(10) Pour fluid system into cell to full and perform filtration test at room temperature with 500 psi nitrogen for at least 36 minutes.
(11) Plot filtrate volume data in square root of time. Eventually the data should make a straight line when plotted in square root of time, showing good filtration behavior.

In some embodiments, a specific mixing order of constituents is followed in the preparation of the drill-in fluid, which results in improved drill-in fluid performance and/or removal upon completion of a desired treatment. Initially an aqueous fluid is mixed with any desired salt such as calcium chloride or other salt for a sufficient time to substantially dissolve the salt in the aqueous fluid. The salt solution or brine then is mixed with gelatin with suitable agitation to disperse the gelatin uniformly in the solution. Upon at least partial hydration of the gelatin, a viscosifier such as xanthan is added to the mixture and mixed until the xanthan is substantially in solution. The degradable high strength polymetaphosphate material is then added to the drill-in fluid with sufficient mixing to substantially distribute the material within the fluid in preparation for introduction into the subterranean formation. The fluid may be permitted to set for from a couple minutes to over 30 minutes prior to addition of the polymetaphosphate material. While it is preferred that any additional additives desired to be included in the treatment fluid are added after admixing of the polymetaphosphate material, it is to be understood that additional additives may be incorporated after admixing of the xanthan or after the gelatin or otherwise so long as the additional additive does not adversely affect the mixing of the primary constituents.

The following examples illustrate the presently disclosed methods and materials; however, those skilled in the art will recognize numerous variations within the spirit of the invention and scope of the claims. In no way should the following examples be read to limit, or to define, the scope of the invention.

EXAMPLES

The following examples are included to demonstrate certain embodiments of the presently disclosed methods and materials. It should be appreciated by those of skill in the art that the techniques disclosed in the examples which follow represent techniques discovered by the inventor to function well in the practice of the invention, and thus can be considered to constitute acceptable modes for its practice. However, those of skill in the art should, in light of the present disclosure, appreciate that many changes can be made in the specific embodiments which are disclosed and still obtain a like or similar result without departing from the spirit and scope of the invention.

To facilitate a better understanding of the present disclosure, the following examples of certain aspects of some embodiments are given.

Materials Used in Examples

Raw materials used herein are shown in Table 1, below.

TABLE 1

| Component | Material Used |
| --- | --- |
| Aqueous base fluid | Tap water |
| Salt | Calcium chloride (CaCl$_2$) |
| Viscosifier | Xanthan, ZANFLO ™ xanthan gum available from Kelco Oil Field Group |
| Fluid loss control additive | Starch, CM STARCH from Prince Energy, LLC |
| | Gelatin, Knox Unflavored Gelatin |
| Bridging agent | Polymetaphosphate particulate ULT-100, available from LyondellBasell Industries |
| Acid | Hydrochloric acid (HCl) |
| | Acetic acid (CH$_3$COOH) |
| Surfactant | Dawn dishwashing soap |
| | Velox-SLS available from ARC Product, Inc. |

Preparation of Examples

The drill-in fluids were prepared using the following general mixing procedure with deviations that will be explained below. The components and quantities mixed are identified in Table 2, below.

TABLE 2

| Component | Material | \multicolumn{8}{c}{Examples} |
|---|---|---|---|---|---|---|---|---|---|
| | | 1 | 2 | 3 | 4 | 5 | 6 | 7 | 8 |
| Aqueous fluid | Water (mL) | 327 | 327 | 327 | 327 | 327 | 327 | 327 | 327 |
| Salt | Calcium chloride (g) | 6 | 6 | 6 | 6 | 6 | 6 | 6 | 6 |
| Viscosifier | Xanthan (g) | 0.7 | 0.7 | 0.7 | 0.7 | 0.7 | 0.7 | 0.7 | 0.7 |
| Fluid loss control | Starch (g) | 7 | 14 | — | — | — | — | — | — |
| additive | Gelatin (g) | — | — | 7 | 14 | 14 | 14 | 14 | 7 |
| Bridging agent | Polymetaphosphate, ULT-100 25 micron (g) | 20 | 20 | 20 | 20 | 20 | 20 | 20 | 20 |
| | Polymetaphosphate, ULT-100 5 micron (g) | 20 | 20 | 20 | 20 | 20 | 20 | 20 | 20 | a. Examples 1, 2, and 4-8

A measured quantity of tap water was placed in a blender jar (Hamilton Beach Blender, overhead blender similar to a model no. HMD200) and the blender was set to medium. The calcium chloride was added and. mixed until substantially dissolved in the water. The fluid loss control additive (starch or gelatin) was then added slowly to the solution while mixing, wherein slowly means at a rate sufficient to control or eliminate clumping of the fluid loss control additive and/or to control or eliminate foaming of the mixture of fluid loss control additive, salt, and water. The xanthan was then slowly added with continued mixing until the xanthan goes into solution. The solution then was allowed to sit for 30 minutes to complete gelation. The blender then was restarted and the polymetaphosphate particulate was added and stirred until uniformly distributed.

b. Example 3

A measured quantity of tap water was placed in a blender jar (30 setting on a PowerStat Model 116B connected to a Hamilton Beach Overhead "Malt" mixer) and the blender was set to medium. The fluid loss control additive was added to the solution while mixing at a rate similar to the addition rate used in Examples 1, 2, and 4-8. The calcium chloride was then added and mixed until substantially dissolved. This resulted in foaming of the mixture when the calcium chloride is added, which was later discovered to result in reduced fluid loss control. The xanthan was then slowly added with continued mixing until the xanthan goes into solution. The solution then was allowed to sit for 30 minutes to complete gelation. The blender then was restarted and the polymetaphosphate particulate was added and stirred until uniformly distributed.

Fluid Loss Testing

The general test procedure was to pour each example drill-in fluid was poured into a HPHT cell (HTHP Filter Press Cell, Ofite™ Model 171-00-C) containing a 20 micron ceramic disc that was saturated with calcium chloride solution prior to addition of the test fluid. Testing of each example was performed using a 500 psig differential pressure at 150° F. (~66° C.), and the fluid loss was measured over time. The results of the tests were plotted as fluid loss (mL) vs. square root of time as shown in Table 3 below and in The FIGURE.

TABLE 3

| Time | \multicolumn{8}{c}{Example} |
|---|---|---|---|---|---|---|---|---|
| (min.) | 1 | 2 | 3 | 4 | 5 | 6 | 7 | 8 |
| 1 | 14 | 9.2 | 42 | 21.2 | 18 | 15.8 | 10.6 | 25.4 |
| 4 | 20 | 11 | 46 | 22 | 19 | 16.2 | 11.4 | 28 |
| 9 | 25 | 12.8 | 47.5 | 22.5 | 20.2 | 16.8 | 12 | 29 |
| 16 | 27.8 | 14 | 48.5 | 23 | 21.8 | 17.6 | 13 | 31 |
| 25 | 30 | 15 | 50.5 | 24 | 22.8 | 18.4 | 14 | 32.6 |
| 36 | 31.2 | 16 | 52 | 25 | 23.8 | 19 | 15 | 33.6 |

Examples 1 and 2, with starch as the fluid loss control additive, were tested to establish benchmarks to evaluate the improvement of replacement with gelatin. Example 3 used the same amount of gelatin corresponding to the amount of starch in Example 1 and was found to have unacceptably high fluid loss. Tests on Examples 4-8 demonstrate the effect the rate of addition of the gelatin has upon the fluid loss of the treatment fluid. Test results for Example 3 showed the negative effects of rapid addition of the gelatin to the blender jar followed by addition of the calcium chloride. Test results for Examples 4-8 show the beneficial results of slower addition rates of gelatin after addition of the calcium chloride as shown in Table 3 and The FIGURE.

Test results on Examples 4-7 show that filter cake formed by using double amount of gelatin (as compared to the amount of starch in Example 1) showed improved fluid loss control relative to Example 1. Additionally, filter cake in each of Examples 4-7 formed more dense, compact layer in comparison to lower concentration of gelatin in Example 3. Test results of Example 8 show that filter cake formed by using the same amount of gelatin (as compared to the amount of starch in Example 1) performed competitively with Example 1. Further, the ultimate fluid loss numbers (see e.g. at time=36 minutes) are very comparable.

Filter Cake Degradation Testing

Filter cake degradation testing was performed on Examples 1, 5, 6, and 7 after completion of fluid loss tests.

a. Example 1

After measuring fluid loss, mud was slowly poured off of the filter cake. Water was then added slowly to the HTHP cell and pressured up to 100 psig and heated to 150° F. The filter cake was checked for integrity. Then the water was slowly poured off of the filter cake, and a solution of 5 wt. % HCL in water was added to the HTHP cell. A pressure of 100 psig and 150° F. was again used to check the integrity of the filter cake. Pressure was then held for 1 hour and rechecked every 30 minutes thereafter, checking filter cake for blow-through at each time point.

b. Example 5

After measuring fluid loss, mud was slowly poured off of the filter cake. A solution of 5 wt. % HCL in water was added slowly to the HTHP cell. The HTHP cell was then pressured up to 100 psig, heated to 150° F. and held for 1 hour and then checked for blow-through.

This test demonstrates the ability to readily remove the bridging agent with 5% HCl. Results are shown in Table 4 below.

c. Example 6

After measuring fluid loss, mud was slowly poured off of the filter cake. Water was then added slowly to the HTHP cell and pressured up to 100 psig and heated to 150° F. The filter cake was checked for integrity. Then the water was slowly poured off of the filter cake, and a solution of 10 wt. % acetic acid in water was added to the HTHP cell. A pressure of 100 psig and 150° F. was again used to check the integrity of the filter cake. Pressure of 100 psig and temperature of 150° F. were then held for 1 hour and checked for blow-through. Three drops of Dawn dish soap were added to the HTHP cell. Pressure of 100 psig and temperature of 150° F. were then held for 1 hour and checked for blow-through.

This test shows the improvement with slowed addition of the gelatin and the ability of other acids to remove the bridging agent. Results are shown in Table 4 below.

d. Example 7

After measuring fluid loss, mud was slowly poured off of the filter cake. Water was then added slowly to the HTHP cell and pressured up to 100 psig and heated to 150° F. The filter cake was checked for integrity. Then the water was slowly poured off of the filter cake, and a solution of 15 wt. % HCl in water and *Velox*-SLS was added to the HTHP cell. A pressure of 100 psig and 150° F. was again used to check the integrity of the filter cake. Pressure of 100 psig and temperature of 150° F. were then held for 1 hour and checked for blow-through.

This test demonstrates the further improvement in fluid loss reduction achieved with slow addition of the gelatin to the fluid during the mixing process. The test also demonstrates the ability of 15% HCl to readily remove the bridging agent. At each time checkpoint, "controlled means that the filter cake remained intact and controlling fluid loss, and "uncontrolled" means there was no control of fluid loss by the filter cake. Results are shown in Table 4 below.

TABLE 4

| Test | Degradation fluid | Time (min.) | Results |
|---|---|---|---|
| 1 | Water | 1 | Controlled |
|  | 5% HCl* | 1 | Controlled |
|  | 5% HCl* | 31 | Uncontrolled |
|  | 5% HCl* | 61 | Uncontrolled |
| 5 | 5% HCl | 60 | Uncontrolled |
| 6 | Water | 1 | Controlled |
|  | (10%) CH₃COOH* | 61 | Controlled |
|  | (10%) CH₃COOH* + 3 drops Dawn | 121 | Controlled |

TABLE 4-continued

| Test | Degradation fluid | Time (min.) | Results |
|---|---|---|---|
| 7 | Water | 1 | Controlled |
|  | 15% HCl* + 2 ml Velox SLS | 61 | Uncontrolled |

*solution in water e. Summary

The above examples show that filter cake fluid loss can be reduced and filter cake degradation can be accelerated by substituting gelatin for starch under appropriate mixing conditions.

Although the presently disclosed material and methods and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the processes, methods, and/or steps described in the specification. As one of the ordinary skill in the art will readily appreciate from the disclosure of the present compositions, methods, and/or steps, presently existing or later to be developed that perform substantially the same function or achieve substantially the same result as the corresponding embodiments described herein, may be utilized according to the present invention. Accordingly, the appended claims are intended to include within their scope such compositions, methods, and/or steps.

What is claimed is:

1. A composition comprising:
    a. an aqueous base fluid,
    b. a viscosifier,
    c. a fluid loss control additive, and
    d. a bridging agent comprising a degradable, high strength composition comprising a polymetaphosphate particulate material having the formula of $[XM(PO_3)_3]_n$, wherein X is selected from Li, Na or K, M is selected from Be, Mg, Ca, Zn, Pb, Cu or Ni, and n is a positive integer greater than 1 and a hardness greater than 3 on the Mohs hardness scale.

2. The composition of claim 1, wherein the X in said polymetaphosphate particulate material is Na, and the M in said polymetaphosphate particulate material is Ca or Mg.

3. The composition of claim 1, wherein:
    a. 15 wt. % to 45 wt. % of the particles in said polymetaphosphate particulate material have a particle size in the range of from 6 mesh to 20 mesh (~3.36 mm-0.841 mm);
    b. 20 wt. % to 45 wt. % of the particles in said polymetaphosphate particulate material have a particle size in the range of from finer than 20 mesh to 70 mesh (~0.841 mm to 0.210 mm); and
    c. 15 wt. % to 40 wt. % of the particles in said polymetaphosphate particulate material have a particle size finer than 70 mesh (<0.210 mm),
    wherein all weight percentages are based on the total weight of all particles.

4. The composition of claim 1, wherein the bridging agent is capable of undergoing heterogeneous and/or homogeneous degradation downhole.

5. The composition of claim 1, wherein the bridging agent is capable of undergoing irreversible degradation downhole.

6. The composition of claim 1, wherein the aqueous base fluid comprises a salt.

7. The composition of claim 1, wherein the viscosifier comprises one or more members selected from the group consisting of biopolymers, cellulose and its derivatives, and guar and its derivatives.

8. The composition of claim 1, wherein the fluid loss control additive is one or more gelatins.

9. A method for reducing fluid loss through a subterranean surface, the method comprising:
   a. providing a treatment fluid comprising the composition of claim 1;
   b. filling a cavity in a subterranean formation with the treatment fluid, wherein the cavity is defined by the subterranean surface;
   c. pressurizing the treatment fluid in the cavity to induce fluid loss from the cavity through the subterranean surface; and
   d. forming a filter cake on the subterranean surface.

10. The method of claim 9, wherein the fluid loss control additive is one or more gelatins.

11. The method of claim 9, wherein the fluid loss rate is less than or equal to 20 mL in tests conducted according to the procedures set forth by API Recommended Practice 13.

* * * * *